United States Patent
Eckert et al.

(10) Patent No.: US 10,853,904 B2
(45) Date of Patent: Dec. 1, 2020

(54) HIERARCHICAL REGISTER FILE AT A GRAPHICS PROCESSING UNIT

(71) Applicant: Advanced Micro Devices, Inc., Sunnyvale, CA (US)

(72) Inventors: Yasuko Eckert, Bellevue, WA (US); Nuwan Jayasena, Sunnyvale, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 537 days.

(21) Appl. No.: 15/079,543

(22) Filed: Mar. 24, 2016

(65) Prior Publication Data

US 2017/0278213 A1    Sep. 28, 2017

(51) Int. Cl.
- *G06T 1/20* (2006.01)
- *G06T 1/60* (2006.01)
- *G06F 9/38* (2018.01)
- *G06F 9/30* (2018.01)

(52) U.S. Cl.
CPC ............ *G06T 1/20* (2013.01); *G06F 9/30123* (2013.01); *G06F 9/30138* (2013.01); *G06F 9/3851* (2013.01); *G06F 9/3887* (2013.01); *G06T 1/60* (2013.01)

(58) Field of Classification Search
CPC .................................. G06T 1/20; G06T 1/60
USPC ....................................................... 345/522
See application file for complete search history.

(56) References Cited

U.S. PATENT DOCUMENTS

| | | | | |
|---|---|---|---|---|
| 2011/0078381 | A1* | 3/2011 | Heinrich | G06F 12/0842 711/122 |
| 2014/0176187 | A1* | 6/2014 | Jayasena | H03K 19/1776 326/39 |
| 2014/0232729 | A1* | 8/2014 | Hakura | G06T 15/005 345/506 |
| 2015/0067691 | A1* | 3/2015 | Johnson | G06F 9/5016 718/103 |

(Continued)

FOREIGN PATENT DOCUMENTS

WO    WO2014/183287    * 11/2014

OTHER PUBLICATIONS

M. Gebhart, D. R. Johnson, D. Tarjan, S. W. Keckler, W. J. Daily, E. Lindholm, and K. Skadron, "A hierarchical thread scheduler and register file for energy-efficient throughput processors," ACM Transactions on Computer Systems (TOCS), vol. 30, pp. 8:1-8:38, Apr. 2012.*

(Continued)

*Primary Examiner* — Jin Ge (57) ABSTRACT

A processor employs a hierarchical register file for a graphics processing unit (GPU). A top level of the hierarchical register file is stored at a local memory of the GPU (e.g., a memory on the same integrated circuit die as the GPU). Lower levels of the hierarchical register file are stored at a different, larger memory, such as a remote memory located on a different die than the GPU. A register file control module monitors the status of in-flight wavefronts at the GPU, and in particular whether each in-flight wavefront is active, predicted to be become active, or inactive. The register file control module places execution data for active and predicted-active wavefronts in the top level of the hierarchical register file and places execution data for inactive wavefronts at lower levels of the hierarchical register file.

20 Claims, 5 Drawing Sheets

(56) References Cited

U.S. PATENT DOCUMENTS

2016/0124873 A1* 5/2016 Xu .................. G06F 13/161
715/105

OTHER PUBLICATIONS

M. Abdel-Majeed and M. Annavaram, "Warped register file: A power efficient register file for gpgpus," in Proceedings of the 2013 IEEE 19th International Symposium on High-Performance Computer Architecture, HPCA '13, 2013.*

M. Awatramani, X. Zhu, J. Zambreno, and D. Rover, "Phase aware warp scheduling: Mitigating effects of phase behavior in gpgpu applications," in Proc. of the 24th Int. Conf. on Parallel Architecture and Compilation Techniques, 2015, pp. 1-12.*

M. Gebhart, S. W. Keckler, and W. J. Daily, "A Compile-Time Managed Multi-Level Register File Hierarchy," in International Symposium on Microarchitecture, Dec. 2011, pp. 465-476.*

Han, S., Jang, K., Park, K., and Moon, S. Packetshader: a gpu-accelerated software router. ACM SIGCOMM Computer Communication Review 40, 4 (2010), 195-206.*

Cruz, José-Lorenzo, et al., "Multiple-banked register file architectures," Proceedings of the 27th annual international symposium on Computer architecture, p. 316-325, Jun. 2000, Vancouver, British Columbia, Canada.

Gebhart, Mark, et al., "Energy-efficient Mechanisms for Managing Thread Context in Throughput Processors," In Proceedings of 38th Annual International Symposium on Computer Architecture (ISCA), p. 1-12, Jun. 2011.

* cited by examiner

HIERARCHICAL REGISTER FILE AT A GRAPHICS PROCESSING UNIT

BACKGROUND

Field of the Disclosure

The present disclosure relates generally to processors and more particularly to graphics processing units for processors.

Description of the Related Art

To improve performance, processors often include a graphics processing unit (GPU) to process graphics and video processing operations and certain other types of computations. In order to efficiently execute these operations, the GPU divides the operations into threads and groups similar threads, such as similar operations on a vector or array of data, into sets of threads referred to as wavefronts. The GPU executes the threads of one or more wavefronts in parallel at different compute units (CUs) of the GPU. Processing efficiency of the GPU can be enhanced by increasing the number of wavefronts that are "in-flight," that is, the number of wavefronts that are executing, or ready to be executed, at the compute units at a given point of time. However, the number of in-flight wavefronts is limited by the resources available at the GPU, such resources including the size of a register file used to by the compute units to execute the corresponding threads.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for employing a hierarchical register file in a graphics processing unit (GPU) of a processor in order to increase the number of in-flight wavefronts that can be processed by the GPU. In some embodiments, a top level of the hierarchical register file is stored at a local memory of the GPU (e.g., a memory on the same integrated circuit die as the GPU). Lower levels of the hierarchical register file are stored at a different, larger memory, such as a remote memory located on a different die than the GPU. A register file control module monitors the status of in-flight wavefronts at the GPU, and in particular whether each in-flight wavefront is active, predicted to become active (predicted-active), or inactive (e.g., stalled waiting for results of a load instruction). The register file control module places execution data for active and predicted-active wavefronts in the top level of the hierarchical register file and places execution data for inactive wavefronts at lower levels of the hierarchical register file. The GPU thereby supports efficient execution of active wavefronts and rapid resumption of execution when inactive wavefronts return to active status. The hierarchical register file therefore enables a higher number of in-flight wavefronts in the GPU without consuming an undesirably large amount of circuit area and power.

Figure 1:
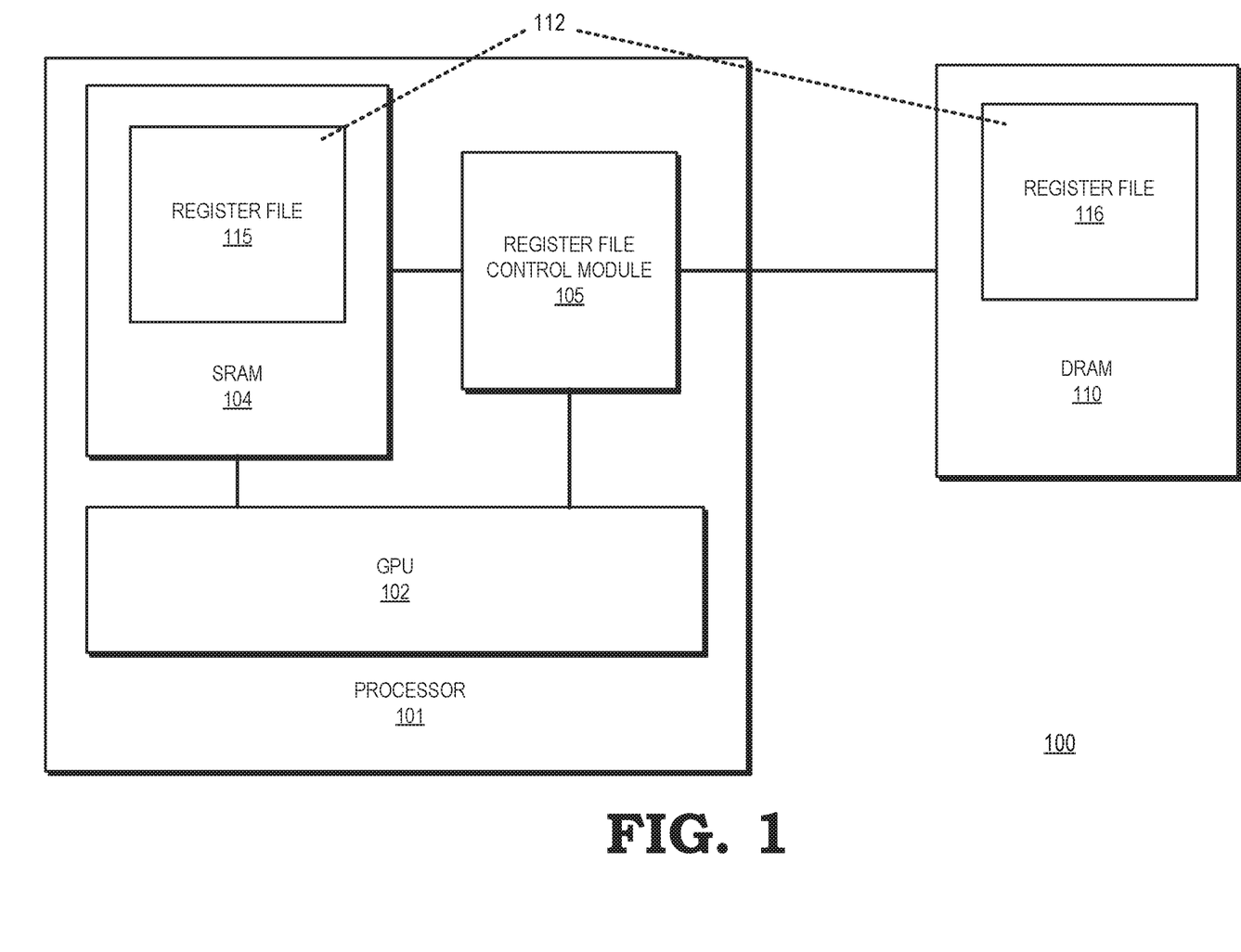
FIG. 1 is a block diagram of a processing system employing a hierarchical register file in accordance with some embodiments.

FIG. 1 illustrates a block diagram of a processing system 100 employing a hierarchical register file for a GPU in accordance with some embodiments. The processing system 100 is generally configured to execute sets of instructions, organized as computer programs, in order to carry out operations for an electronic device. Accordingly, the processing system 100 can be incorporated into any of a variety of electronic devices, including a desktop or laptop computer, server, tablet, smartphone, game console, and the like. To support execution of the computer programs, the processing system 100 includes a processor 101 and a memory 110. In the depicted example of FIG. 1, the memory 110 is dynamic random access memory (DRAM) generally configured to store and retrieve data in response to requests from the processor 101. In some embodiments, and as described further below with respect to FIG. 4, the processor 101 and the memory 110 can be arranged in a stacked-die configuration, with the processor 101 located at one or more logic dies, and the memory 110 located at one or more separate memory dies arranged in a vertically stacked die arrangement and connected to the logic dies via an interposer or through-silicon vias (TSVs).

To support execution of instructions for graphics and certain other types of workloads, the processor 101 includes a GPU 102, a memory 104, and a register file control module 105. Although for clarity the memory 104 is illustrated separately from the GPU 102 in FIG. 1, in some embodiments the memory 104 and register file control module 105 are part of the GPU 102 (e.g., part of the same integrated circuit die on which the GPU 102 is implemented). In some embodiments, the processor 101 includes additional modules, not illustrated at FIG. 1, to facilitate execution of instructions, including one or more additional processing units such as one or more central processing units (CPUs), additional GPUs, one or more digital signal processors and the like. In addition, the processor 101 can include memory and input/output interface modules, such as a northbridge and a southbridge, additional memory to provide caches and other supporting memory structures for the processing units, and the like.

The GPU 102 is generally configured to execute operations associated with graphics processing, video processing, vector processing, and the like, as generated or initiated by a CPU or other processing unit. The processor 101 divides the operations into threads and collects similar threads into sets as understood by those skilled in the art. These collections of similar threads are referred to herein as wavefronts. An example of a similar set of threads that can be collected into a wavefront is a set of threads performing similar operations on different elements of a data array. In some embodiments, the GPU 102 includes a plurality of compute units (CUs) that can execute all or a subset of the threads of a wavefront concurrently, or can execute the threads for multiple wavefronts concurrently, depending on the size (the number of threads) of the wavefront. A wavefront that is in the course of being executed at the CUs of the GPU 102 is referred to as "in-flight" or "pending" at the GPU 102. To further enhance processing efficiency, the GPU 102 can schedule multiple wavefronts for execution at each CU, so that each CU can have multiple in-flight wavefronts at a given time. The CUs switch between the in-flight wavefronts based on the execution status of each wavefront. In particular, a wavefront can have an active state or status or an inactive state or status. As used herein, a wavefront is inactive if the wavefront is identified as not performing useful operations at the GPU 102 for a relatively large number of clock cycles. A wavefront is active by default, that is, if the wavefront has not been identified as an inactive wavefront. As described further herein, some inactive wavefronts may be identified as "predicted-active", indicating that they are currently inactive but are predicted to become active in the relatively near future.

The status of a wavefront changes depending on its state at the CUs of the GPU 102. For example, an active wavefront can become inactive as it awaits results of a transaction with system memory (not shown at FIG. 1). Once the results of the transaction have been returned to the CU (or otherwise reached a designated point at the processor 101) the inactive wavefront can be returned to active status. In some embodiments, the CUs periodically identify the status of each in-flight wavefront, and select one or more active CUs for execution until the next status check.

To facilitate efficient execution, the instruction set architecture (ISA) for the GPU 102 operates on a set of registers. Thus, the instructions of the wavefronts use the registers of these sets as operands to store the execution data to be operated on by the instructions. That is, the registers of the register file stage data between memory and the execution units of the CUs. In some embodiments, the processor 101 employs register renaming or similar techniques so that different registers of the register file can correspond to a given register of the ISA for different wavefronts.

In order to execute properly, each in-flight wavefront must be assigned a set of registers in the register file. Accordingly, the larger the register file, the higher the number of in-flight wavefronts that can be scheduled at each CU and the higher the efficiency of the GPU 102. However, in order to reduce execution latency the register file is typically located on the same die as the GPU 102, where limited circuit area restricts the size of the register file. The processing system 100 therefore employs a hierarchical register file 112 that is distributed between the memory 104 and the memory 110. The hierarchical register file 112 includes a plurality of levels organized in a hierarchy, wherein each level corresponds to a different set of registers. The top level of the hierarchy is located at the memory 104 and is accessed by wavefronts executing at the CUs of the GPU 102. Lower levels of the hierarchy are located at the memory 110. The register file control module 105 manages the execution data for each in-flight wavefront based on their corresponding status, so that the execution data for active and predicted-active wavefronts is stored at the top level of the hierarchical register file 112 and execution data for inactive wavefronts is stored at lower levels of the hierarchical register file 112. Further, as the statuses of the in-flight wavefronts change, the register file control module 105 transfers execution data between levels of the register file to ensure that execution data for active wavefronts is stored at the highest level of the hierarchical register file 112. This ensures that active wavefronts can quickly access their execution data while providing for a large overall register file. The processing system 100 thereby supports a large number of in-flight wavefronts, which improves processing efficiency.

To illustrate, in the embodiment of FIG. 1 the processing system 100 implements a hierarchical register file 112 having two levels: a top level (designated register file 115) located at the memory 104 and a lower level (designated register file 116) located at the memory 110. The register file control module 105 monitors the status of in-flight wavefronts at the GPU 102 and, based on the monitored statuses transfers execution data between the register file 115 and register file 116. In particular, the register file control module 105 places execution data for active wavefronts at the register file 115 and execution data for inactive wavefronts at the register file 116. For predicted-active wavefronts, the register file control module 105 places execution data at the register file 115 if there is space available after register space has been assigned to active wavefronts. If there is insufficient space available, the register file control module 105 stores the execution data for one or more predicted-active wavefronts at the register file 116.

Figure 2:
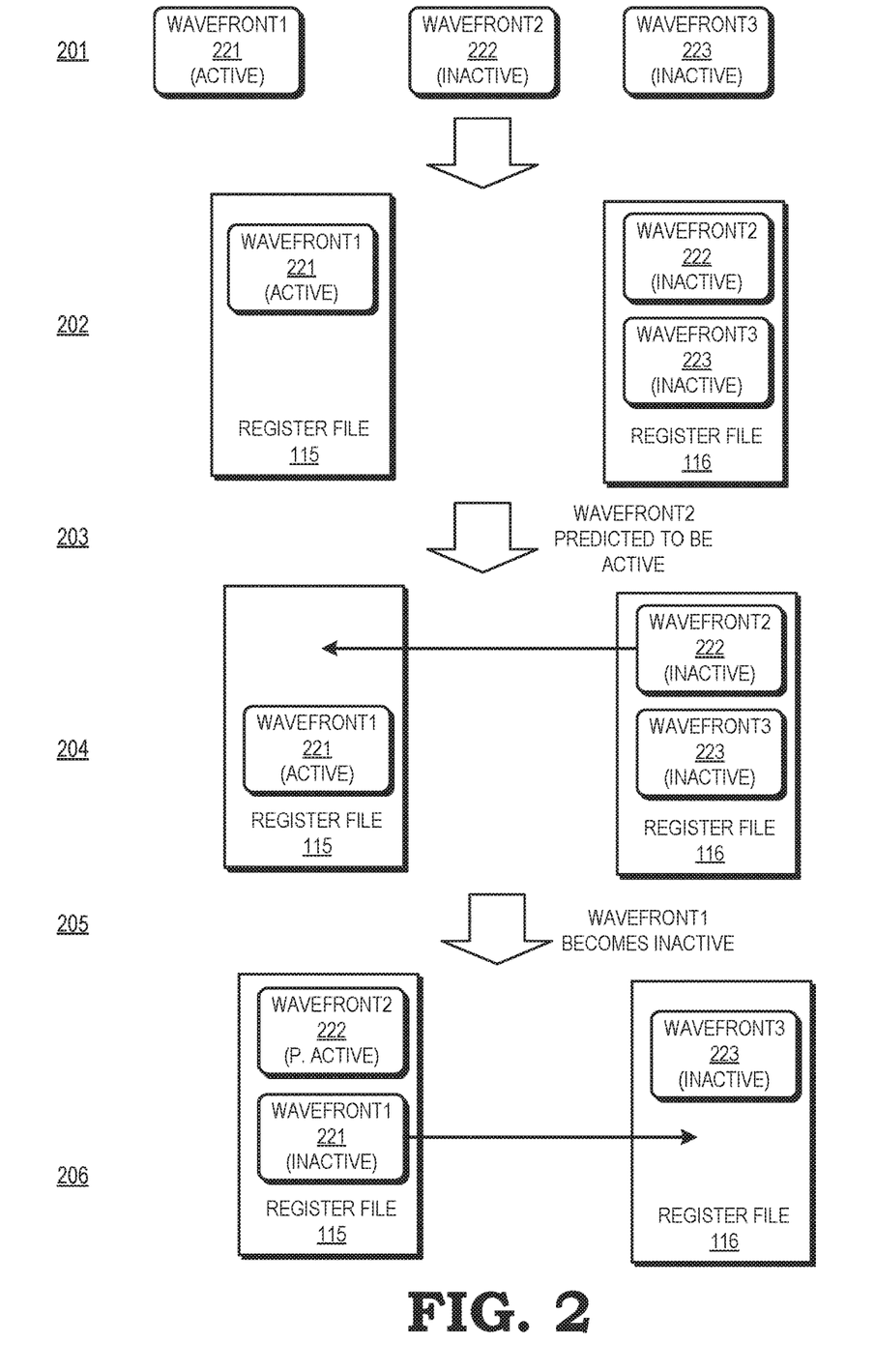
FIG. 2 is a diagram illustrating an example of the processing system of FIG. 1 employing the hierarchical register file in accordance with some embodiments.

An example of the register file control module 105 managing the hierarchical register file 112 is illustrated at FIG. 2. In the depicted example of FIG. 2, there are three in-flight wavefronts at the processor 101, designated wavefront 221, wavefront 222, and wavefront 223. At a time 201, the register file control module 105 identifies that wavefront 221 is active, and wavefronts 222 and 223 are inactive, as they are waiting on results of a given instruction, such as awaiting the results of a memory transaction. Accordingly, at time 202, the register file control module 105 places execution data for the wavefront 221 at the register file 115 and places the execution data for the wavefronts 222 and 223 at the register file 116. In some embodiments, when a wavefront is initiated as an in-flight wavefront, the register file control module 105 assigns it register space at the register file 116. When the wavefront becomes active, the register file control module 105 places the execution data for the wavefront at the register file 115 by transferring the execution data for the wavefront from the register file 116 to the register file 115.

At time 203, the register file control module 105 identifies that the wavefront 222 is predicted to become an active wavefront in the relatively near future. That is, the register file control module 105 identifies that the wavefront 222 has transitioned from an inactive status to a predicted-active status. The register file control module 105 can make this identification based on any of a number of criteria. For example, in some embodiments a wavefront becomes inactive as it awaits the results of execution of a particular operation, such as a load operation that accesses system memory. The register file control module 105 can monitor the buffers and other circuitry of execution units of the GPU 102 to identify when the particular operation is finished or close to finishing. For example, the register file control module 105 can monitor one or more buffers of a load/store unit of the GPU 102 to determine when the load operation is about to be sent to the system memory, or when the results of the load operation have been received at the load/store unit and, based on this information, change the status of the wavefront 222 from inactive status to predicted-active status. In some embodiments, the register file control module 105 can initiate a timer to an initial value when a wavefront becomes inactive, and transition the wavefront to predicted active status when the timer reaches a threshold value. The initial value or threshold value can be based on an analysis of prior behavior of the wavefront (or of similar wavefronts), such as an analysis of how long the wavefront has been inactive in prior contexts. In some embodiments, the register file control module 105 can monitor the GPU 102 to determine when active wavefronts are finishing, or will soon be finishing, execution and predict which inactive wavefronts will then become active, and transition those inactive wavefronts to predicted-active status.

In response to the wavefront 222 transitioning to predicted-active status, at time 204 the register file control module 105 transfers the execution data for the wavefront 222 from the register file 116, at the memory 110, to the register file 115 at the memory 104. This ensures that the execution data for the wavefront 222 is already stored at the register file 115 when the wavefront 222 returns to active status, improving processing efficiency.

At time 205 the register file control module 105 identifies that the wavefront 221 has transitioned from active status to inactive status. The register file control module 105 can identify this transition based on any of a number of criteria. In some embodiments, during compilation of the computer program that generated the wavefront, a compiler may identify instructions that are expected to cause the wavefront 221 to stall or otherwise experience high execution latency. The compiler marks these instructions by, for example, setting a bit in a control field of the instruction. The register file control module 105 monitors the instructions of the active wavefronts and, in response to identifying a marked instruction, identifies the corresponding wavefront as inactive. In some embodiments, the register file control module 105 initiates a timer in response to the execution of an instruction for a wavefront being dispatched for execution. In response to the timer exceeding a stored threshold, indicating that the instruction is a high latency instruction, the register file control module identifies the corresponding wavefront as an inactive wavefront.

In response to the wavefront 221 becoming inactive, at time 206 the register file control module 105 transfers the execution data for the wavefront 221 from the register file 115 at the memory 104 to the register file 116 at the memory 110. This frees up space at the register file 115 for active wavefronts. For example, if the wavefront 223 becomes active, the register file control module 105 can transfer the execution data for the wavefront 223 from the register file 116 to the register file 115. Thus, the register file control module 105 manages the location of execution data for in-flight wavefronts so that the execution data for active and predicted-active wavefronts are placed at the register file 115 and execution data for inactive wavefronts is placed at the register file 116. The register file control module 105 thereby maintains the low latency of a small register file at the memory 104 while using the memory 110 to maintain a large overall register file. The register file control module 105 thereby supports low execution latency for active wavefronts while providing a large overall register file to support a high number of in-flight wavefronts.

Figure 3:
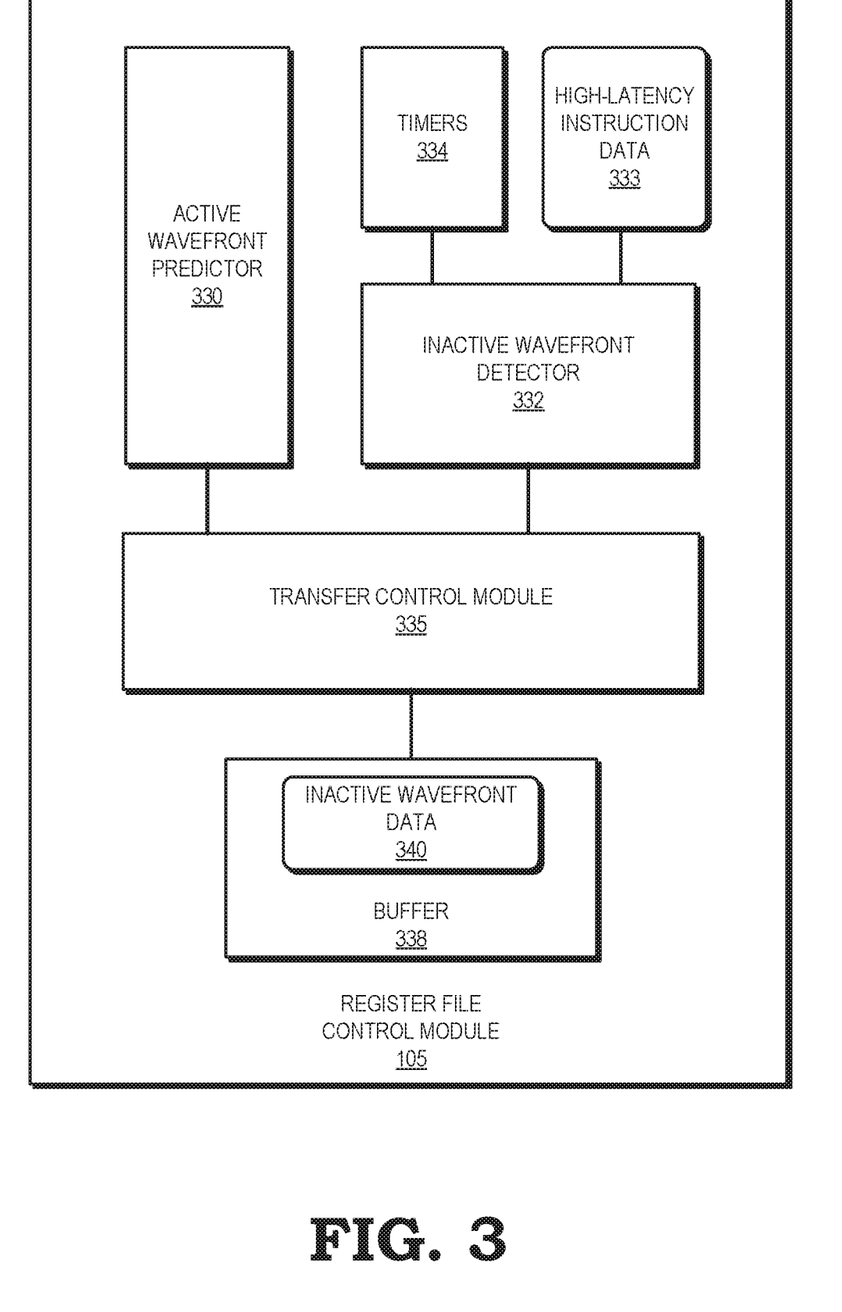
FIG. 3 is a block diagram of a register file control module of the processing system of FIG. 1 in accordance with some embodiments.

FIG. 3 illustrates a block diagram of the register file control module 105 in accordance with some embodiments. In the illustrated example, the register file control module 105 includes an active wavefront predictor 330, an inactive wavefront detector 332, timers 334, a transfer control module 335, and a buffer 338. The active wavefront predictor 330 is a module configured to monitor the execution units and other modules of the GPU 102 (FIG. 1) to predict when inactive wavefronts are likely to become active wavefronts in the near future. In some embodiments, the active wavefront predictor 330 predicts that an inactive wavefront is likely to become an active wavefront based on data stored at one or more registers, buffers, or other circuitry of the GPU 102 indicating that execution of a particular instruction associated with the wavefront has been completed or is expected to be completed within a threshold number of clock cycles. In some embodiments, the active wavefront predictor 330 predicts that an inactive wavefront is likely to become active in response to expiration of a threshold number of clock cycles after the wavefront was identified as inactive. In some embodiments, the threshold number of clock cycles is based on characterization of the wavefront or of a computer program that generated the wavefront.

The inactive wavefront detector 332 is a module configured to monitor the GPU 102 to identify when an active wavefront has transitioned to inactive status. In some embodiments, the inactive wavefront detector 332 uses both the timers 334 and high-latency instruction data 333 to make this identification. The high-latency instruction data 333 identifies instructions that have been marked by a compiler, or via other characterization and analysis, as requiring a relatively long amount of time to complete execution at the GPU 102. The inactive wavefront detector 332 monitors a fetch stage, dispatch stage, or other stage of the GPU 102 to identify the instructions to be executed by each active wavefront. In response to identifying an instruction that is listed in the high-latency instruction data 333, the inactive wavefront detector 332 indicates that the corresponding wavefront has transitioned to the inactive state.

In addition, the inactive wavefront detector 332 can employ the timers 334 to identify high-latency instructions that may not have been marked in the high-latency instruction data 333. To illustrate, in response to dispatch of an instruction for a wavefront at the GPU 102, the inactive wavefront detector 332 can initiate a selected one of the timers 334, thereby associating the selected timer with the wavefront. The inactive wavefront detector 332 awaits a signal from an execution stage or other stage of the GPU 102 for an indication that the instruction has been completed and, in response to the signal, resets the corresponding one of the timers 334. In response to one of the timers 334 reaching a threshold value prior to receiving the completion indication for the corresponding instruction, the inactive wavefront detector 332 indicates the corresponding wavefront has transitioned to the inactive status.

The transfer control module 335 monitors the state of in-flight wavefronts as indicated by the active wavefront predictor 330, the inactive wavefront detector 332, and the GPU 102. In response to an active wavefront transitioning to inactive status, the active wavefront predictor 330 identifies whether there are any active or predicted-active wavefronts awaiting transfer to the register file 115. If so, the transfer control module 335 transfers data for the inactive wavefront from the register file 115 to the register file 116. In response to an inactive wavefront transitioning to a predicted-active or active status, the transfer control module 335 identifies whether there is space available at the register file 115 to store the execution data for the wavefront. Once space is available, the transfer control module 335 transfers the execution data for the wavefront from the register file 116 to the register file 115.

In some embodiments, execution data for a wavefront can be altered while the wavefront is inactive or awaiting transfer to the register file 115 in the active or predicted-active state. Accordingly, to ensure that execution data for wavefronts is kept up to date, the register file control module 105 employs the buffer 338 to store inactive wavefront data 340. In particular, as execution data for inactive wavefronts is changed by execution units of the GPU 102, the register file control module 105 stores the changed data at the buffer 338 as the inactive wavefront data 340. In some embodiments, the transfer control module 335 periodically updates the execution data at the register file 116 based on the inactive wavefront data 340 to ensure that execution data for inactive wavefronts is kept up to date. In other embodiments, the transfer control module 335 updates the data for a predicted-active or active wavefront after the wavefront has been transferred to the register file 115.

Figure 4:
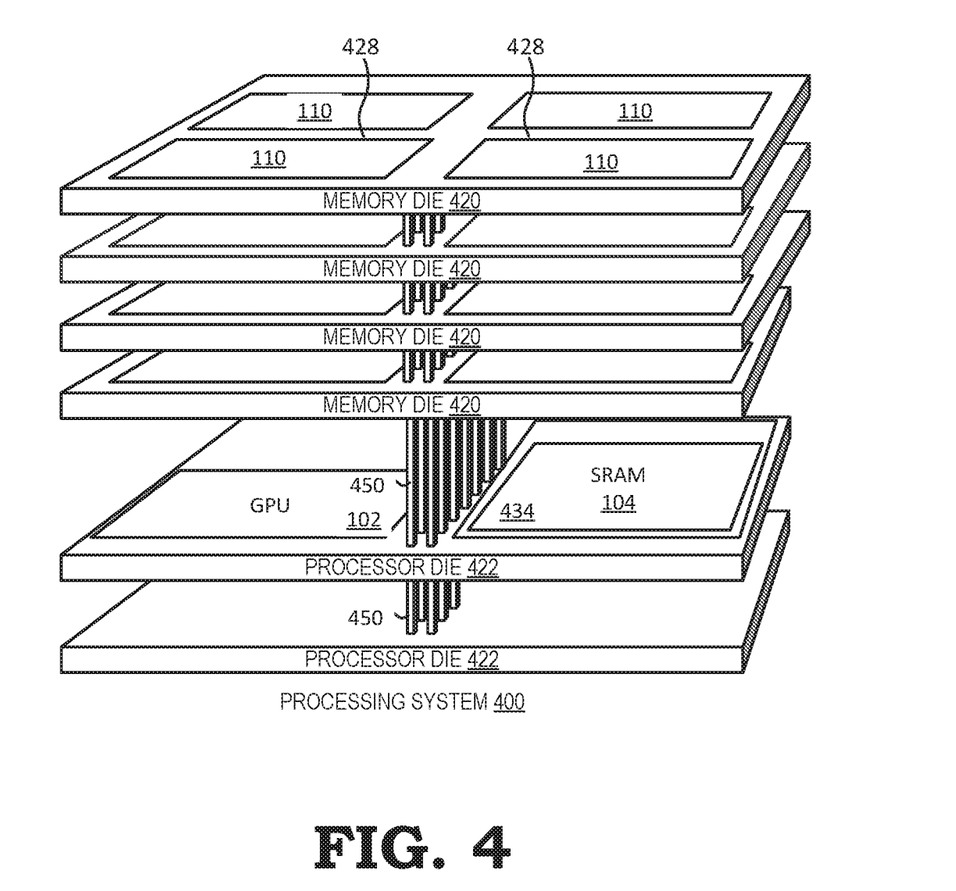
FIG. 4 is a diagram illustrating an exploded perspective view of an example die-stacked processing system which includes a hierarchical register file in accordance with some embodiments.

In some embodiments, in order to maintain acceptable execution latency for in-flight wavefronts, the transfers between levels of the register file hierarchy (e.g., between register file 115 and register file 116) must achieve a threshold level of latency. To achieve this level of latency, the processing system 100 can be implemented in a die stacked configuration so that the memory 110 can be quickly accessed by the processor 101. FIG. 4 illustrates an example die-stacked processing system 400 corresponding to the processing system 100 in accordance with some embodiments. The example system includes a processor dies 422 and a vertically-stacked memory subsystem comprised of layers 420. Dies 422 includes the GPU 102 and the memory 104. The dies 422 can also include other circuitry such as the register file control module 105, memory controllers, input/output interfaces, and the like. The dies 420 implement memory arrays such as DRAM, including the memory 110. In the depicted system, a host bus 450 implemented as, for example, a set of through silicon vias (TSVs) connects the processor dies 420 and the processor dies 422.

The individual dies comprising the vertically stacked processing system 400 are interconnected using TSVs or other similar inter-die interconnects. The vertical die stack of processing system 400 may be fabricated using any of a variety of 3D integrated circuit fabrication processes. In one approach, the dies 420 and dies 422 each are implemented as a separate substrate (e.g., bulk silicon) with active devices and one or more metal routing layers formed at an active surface. This approach can include a wafer-on-wafer process whereby a wafer comprising a matrix of dice is fabricated and thinned, and TSVs are etched through the bulk silicon. Multiple wafers are then stacked to achieve the illustrated layer configuration (e.g., a stack of four wafers comprising memory circuitry die for the three memory layers and a wafer comprising the logic die for a logic layer), aligned, and then joined via thermocompression. The resulting stacked wafer set is singulated to separate the individual 3D IC devices.

In a die-on-die process, the wafer implementing each corresponding layer is first singulated, and then the die are separately stacked and joined to fabricate the 3D IC devices. In a die-on-wafer approach, wafers for one or more layers are singulated to generate the die for one or more layers, and these die are then aligned and bonded to the corresponding die areas of another wafer, which is then singulated to produce the individual 3D IC devices. One benefit of fabricating the dies 420 and dies 422 on separate wafers is that a different fabrication process can be used to fabricate the processor dies 422 than that used to fabricate the memory dies 420. Thus, a fabrication process that provides improved performance and lower power consumption may be used to fabricate dies 422, whereas a fabrication process that provides improved cell density and improved leakage control may be used to fabricate the dies 420 (and thus provide more dense, lower-leakage bitcells for the stacked memory).

In another approach, the dies 420 and dies 422 are fabricated using a monolithic 3D fabrication process whereby a single substrate is used and each die layer is formed on a preceding die layer using a layer transfer process, such as an ion-cut process. The stacked memory devices also may be fabricated using a combination of techniques. For example, a logic layer (dies 422) may be fabricated using a monolithic 3D technique, the memory layers (dies 420) may be fabricated using a die-on-die or wafer-on-wafer technique, or vice versa, and the resulting logic layer stack and memory layer stack then may be bonded together and then bonded to an interposer substrate.

The depicted processing system 400 may be physically implemented with a variety packaging techniques. In some embodiments, dies 420 may be implemented as a separate vertical stack that is horizontally disposed on the surface of an interposer along with processor die 422. In this embodiment, host bus 450 can include conductors implemented in the metal layers of the interposer.

Figure 5:
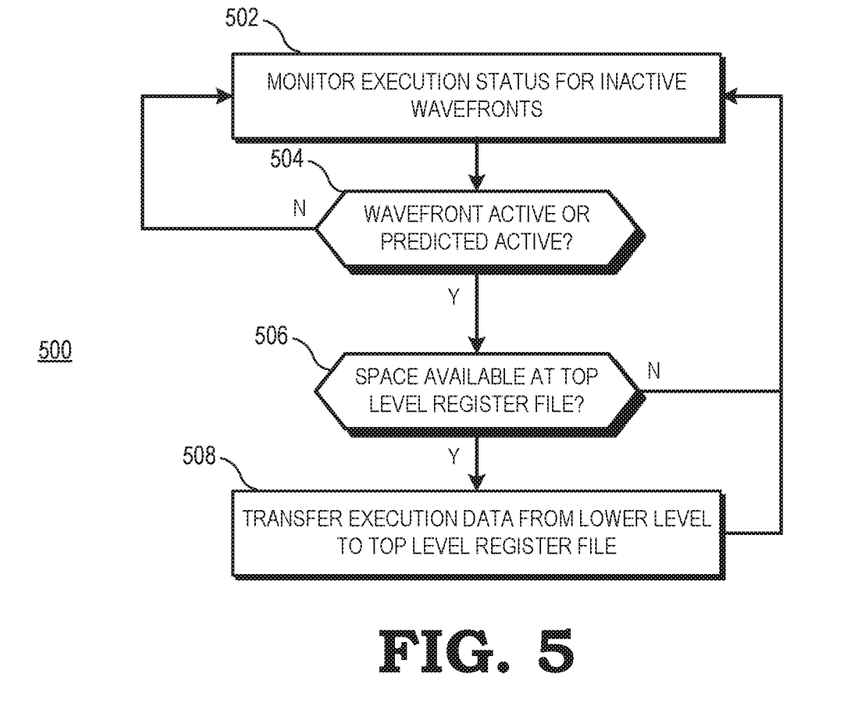
FIG. 5 is a flow diagram of a method of transferring execution data for inactive wavefronts that become predicted-active wavefronts at a hierarchical register file of a GPU in accordance with some embodiments.

FIG. 5 is a flow diagram of a method 500 of transferring execution data for inactive wavefronts that become predicted-active wavefronts at a hierarchical register file of a GPU in accordance with some embodiments. The method 500 is described with respect to an example implementation at the processing system 100 of FIG. 1. At block 502, the register file control module 105 monitors the status of executing instructions at the GPU 102 to predict when an inactive wavefront is likely to become an active wavefront in the near future (that is, has transitioned to a predicted-active status). At block 504 the register file control module 105 identifies if an inactive wavefront has transitioned to the predicted-active or active status. If not, the method flow returns to block 502.

If, at block 504 the register file control module 105 identifies that an inactive wavefront has transitioned to the predicted-active or active status, the method flow moves to block 506 and the register file control module 105 identifies whether there is space available at the register file 115 to store the execution data for the identified wavefront. If not, the method flow returns to block 502. If, at block 506, the register file control module 105 identifies that there is space available at the register file 115 to store the execution data for the identified wavefront, the method flow moves to block 508 and the register file control module transfers the execution data for the identified wavefront from the register file 116 to the register file 115. The method flow then returns to block 502.

Figure 6:
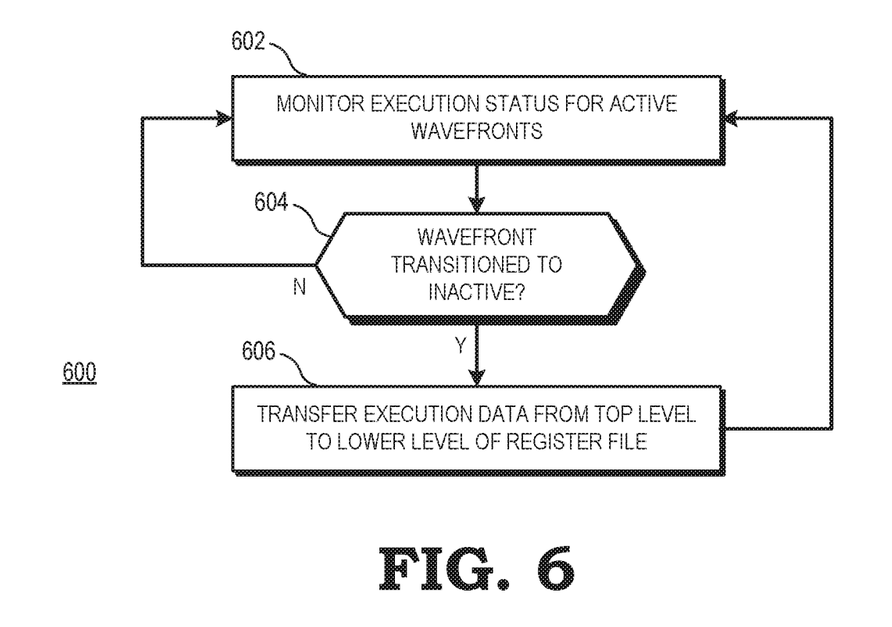
FIG. 6 is a flow diagram of a method of transferring execution data for active wavefronts that become inactive wavefronts at a hierarchical register file of a GPU in accordance with some embodiments.

FIG. 6 is a flow diagram of a method 600 of transferring execution data for active wavefronts that become inactive wavefronts at a hierarchical register file of a GPU in accordance with some embodiments. The method 600 is described with respect to an example implementation at the processing system 100 of FIG. 1. At block 602, the register file control module 105 monitors the status of executing instructions at the GPU 102 to identify when an active wavefront is transitioning to an inactive status. As explained above, the register file control module 105 can identify that an active wavefront is transitioning to an inactive status based on an instruction of the wavefront being marked as a high-latency instruction, based on a timer indicating that an instruction of the wavefront is requiring a relatively long time to complete execution, or based on other criteria. At block 604 the register file control module 105 identifies if an active wavefront has transitioned to inactive status. If not, the method flow returns to block 602. If, at block 604 the register file control module 105 identifies that an active wavefront has transitioned to inactive status, the method flow moves to block 606 and the register file control module 105 transfers execution data for the identified wavefront from the register file 115 to the register file 116, thereby providing room at the register file 115 for execution data of predicted-active and active wavefronts. In some embodiments, the register file control module 105 reduces unnecessary transfers by refraining from transferring data from the register file 115 to the register file 116 until another wavefront whose data has not yet been transferred to the register file 115 is identified as a predicted-active wavefront. From block 606, the method flow returns to block 602.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing system comprising:
a processor to couple to a first memory implementing a first register file and to couple to a second memory implementing a second register file, the processor comprising:
a graphics processing unit (GPU) to execute a plurality of wavefronts, the GPU comprising an active wavefront predictor coupled to an inactive wavefront detector, GPU configured, in response to identifying a wavefront activity status for at least one of the wavefronts, to perform at least one of:
when the wavefront activity status is identified as an active wavefront ready for execution at the GPU, storing execution data for the at least one wavefront at the first register file;
when the wavefront activity status is identified, by the active wavefront predictor, as predicted to transition from an inactive wavefront to an active wavefront within a threshold number of clock cycles, transferring execution data for the at least one wavefront from the second register file to the first register file; and
when the wavefront activity status is identified as an inactive wavefront awaiting execution based on the inactive wavefront detector detecting a high-latency instruction at an instruction pipeline of the processor, storing execution data for the at least one wavefront at the second register file.

2. The processing system of claim 1, wherein the GPU is to:
store the execution data for the at least one wavefront at the second register file by transferring the execution data for the wavefront from the first register file to the second register file.

3. The processing system of claim 2, wherein the GPU is to:
store the execution data for the at least one wavefront at the first register file by transferring the execution data for the at least one wavefront from the second register file to the first register file in response to predicting the at least one wavefront is to become an active wavefront.

4. The processing system of claim 2 wherein the GPU is to:
after transferring the execution data for the at least one wavefront from the first register file to the second register file, transfer the execution data for the at least one wavefront from the second register file to the first register file in response to predicting that the at least one wavefront is to become an active wavefront.

5. The processing system of claim 2, wherein the GPU is to identify that the at least wavefront is an inactive wavefront in response to:
the GPU initiating execution of an instruction; and
identifying that the instruction has been marked as to indicate high-latency.

6. The processing system of claim 2, further comprising a timer, and wherein GPU is to identify that the at least one wavefront is an inactive wavefront in response to:
initiating the timer in response to the GPU initiating execution of an instruction; and
identifying that the timer has exceeded a threshold prior to the GPU completing execution of the instruction.

7. The processing system of claim 2, wherein the GPU further comprises:
a buffer to store execution results for the at least wavefront while its execution data is stored at the second register file.

8. The processing system of claim 7, wherein the GPU is to:
transfer the execution results from the buffer to the second register file.

9. The processing system of claim 2, wherein the processing system comprises a die-stacked memory device including:
a first die comprising the GPU and the first memory; and
a second die comprising the second memory.

10. A method comprising:
in response to a processor that has a first memory coupled to a second memory and a graphics processing unit (GPU) coupled to a register file control module, identifying, using the register file control module having an active wavefront predictor coupled to an inactive wavefront detector, a first wavefront of a plurality of wavefronts pending for execution at the GPU is an active wavefront, storing execution data for the first wavefront at a first register file implemented at the first memory;
in response to the active wavefront predictor predicting a second wavefront of the plurality of wavefronts is to transition from an inactive wavefront to an active wavefront within a threshold number of clock cycles, transferring execution data for the second wavefront from a second register file to the first register file at the first memory; and
in response to the inactive wavefront detector identifying a third wavefront of the plurality of wavefronts is an inactive wavefront awaiting execution based on detecting a high-latency instruction at an instruction pipeline of the processor, storing execution data for the third wavefront at the second register file implemented at the second memory separate from the first memory.

11. The method of claim 10, wherein storing the execution data for the third wavefront at the second register file comprises:
transferring the execution data for the third wavefront from the first register file to the second register file.

12. The method of claim 11, wherein storing the execution data for the second wavefront at the first register file comprises:
transferring the execution data for the second wavefront from the second register file to the first register file in response to predicting the second wavefront is to become an active wavefront.

13. The method of claim 11, further comprising:
after transferring the execution data for the third wavefront from the first register file to the second register file, transferring the execution data for the third wavefront from the second register file to the first register file in response to a prediction that the third wavefront is to become an active wavefront.

14. The method of claim 10, further comprising:
identifying the third wavefront is an inactive wavefront in response to:
the GPU initiating execution of an instruction; and
identifying that the instruction has been marked as to indicate high latency.

15. The method of claim 10, further comprising:
identifying the third wavefront is an inactive wavefront in response to:
initiating a timer in response to the GPU initiating execution of an instruction; and
identifying that the timer has exceeded a threshold prior to the GPU completing execution of the instruction.

16. The method of claim 10, further comprising:
buffering results of an instruction for the third wavefront at the GPU while the execution data for the third wavefront is stored at the second register file.

17. The method of claim 16, further comprising:
transferring the results of the instruction from the buffer to the second register file.

18. The method of claim 16, further comprising:
in response to predicting that the third wavefront is to become an active wavefront:
transferring the results of the instruction for the third wavefront from the second register file to the first register file; and
transferring the execution results from the buffer to the first register file.

19. The method of claim 10, wherein:
the second memory is located at stacked memory die of die-stacked processing system, the die-stacked processing system comprising a set of one or more stacked memory dies and comprising a set of one or more logic dies electrically coupled to the set of one or more stacked memory dies; and
the first memory is located in one of the set of one or more logic dies.

20. A method comprising:
identifying, utilizing a processor that has a first memory coupled to a second memory and a graphics processing unit coupled to a register file control module, at the graphics processing unit using an active wavefront predictor or an inactive wavefront detector coupled in the register file control module, a status of a wavefront as an active status indicating the wavefront is ready for execution, a predicted-active states indicating the wavefront is predicted to be ready for execution within a threshold number of clock cycles, and an inactive status indicating the wavefront is stalled based on detecting a high-latency instruction at an instruction pipeline of the processor;
selecting one of a plurality of register files based on the identified status of the wavefront; and
storing execution data for the wavefront at the selected one of the plurality of register files at either the first memory or second memory based the status of the wavefront.

* * * * *

UNITED STATES PATENT AND TRADEMARK OFFICE
CERTIFICATE OF CORRECTION

| | |
|---|---|
| PATENT NO. | : 10,853,904 B2 |
| APPLICATION NO. | : 15/079543 |
| DATED | : December 1, 2020 |
| INVENTOR(S) | : Yasuko Eckert and Nuwan Jayasena |

It is certified that error appears in the above-identified patent and that said Letters Patent is hereby corrected as shown below:

In the Claims

At Column 10 Line 60, please insert --,-- after "2" and before "wherein"

At Column 11 Line 2, please insert --one-- before "wavefront" and after "least"

At Column 11 Line 16, please insert --one-- before "wave-" and after "least"

At Column 12 Line 37, please insert --a-- before "die-stacked"

At Column 12 Line 52, please replace "states" with "status"

At Column 12 Line 62, please insert --on-- before "the" and after "based"

Signed and Sealed this
Twentieth Day of February, 2024

Katherine Kelly Vidal
*Director of the United States Patent and Trademark Office*